US008454109B2

(12) United States Patent
Shibata

(10) Patent No.: US 8,454,109 B2
(45) Date of Patent: Jun. 4, 2013

(54) IMAGE FORMING DEVICE

(75) Inventor: Hiroyuki Shibata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 375 days.

(21) Appl. No.: 13/011,931

(22) Filed: Jan. 24, 2011

(65) Prior Publication Data

US 2011/0242159 A1 Oct. 6, 2011

(30) Foreign Application Priority Data

Mar. 30, 2010 (JP) ................................ 2010-079609

(51) Int. Cl.

| | |
|---|---|
| ***B41J 29/38*** | (2006.01) |
| ***B41J 29/393*** | (2006.01) |
| ***H04N 1/40*** | (2006.01) |
| ***H04N 1/405*** | (2006.01) |
| ***G06K 15/00*** | (2006.01) |

(52) U.S. Cl.
USPC .................. 347/9; 347/19; 358/3.06; 358/3.1

(58) Field of Classification Search
USPC .............................................................. 347/9
See application file for complete search history.

(56) References Cited

U.S. PATENT DOCUMENTS

| | | | |
|---|---|---|---|
| 2005/0174384 | A1 | 8/2005 | Koitabashi et al. |
| 2006/0170722 | A1 | 8/2006 | Sakai et al. |
| 2006/0209347 | A1 | 9/2006 | Nagaishi et al. |

FOREIGN PATENT DOCUMENTS

| | | | |
|---|---|---|---|
| JP | 5-104726 | A | 4/1993 |
| JP | 11-151821 | A | 6/1999 |
| JP | 11151821 | * | 6/1999 |
| JP | 2006-123522 | A | 5/2006 |
| JP | 2009-154499 | A | 7/2009 |

* cited by examiner

*Primary Examiner* — Uyen Chau N Le
*Assistant Examiner* — Kajli Prince
(74) *Attorney, Agent, or Firm* — SOLARIS Intellectual Property Group, PLLC

(57) ABSTRACT

An image forming device has: a droplet ejecting head that ejects droplets with respect to a recording medium and can form dots of plural diameters; and a control unit that, on the basis of image data expressing a tone value of each pixel in an image to be formed on the recording medium, controls sizes of droplets ejected from the droplet ejecting head such that, in a case in which the tone value is within a predetermined tone range, first dots, whose diameter is greater than a predetermined diameter, are formed at a recording rate that satisfies a predetermined formula, and second dots, whose diameter is less than or equal to the predetermined diameter, are formed between the first dots at a recording rate corresponding to the tone value.

12 Claims, 11 Drawing Sheets

NOZZLE LAYOUT EXAMPLE AND LANDING ORDER OF NOZZLES THAT ARE ADJACENT IN DIRECTION ORTHOGONAL TO SHEET FEEDING DIRECTION

NO CONTACT

MAY OR MAY NOT CONTACT

CONTACTING

D1 AND D2

ONLY D2

IMAGE FORMING DEVICE

CROSS-REFERENCE TO RELATED APPLICATION

This application is based on and claims priority under 35 USC 119 from Japanese Patent Application No. 2010-079609 filed on Mar. 30, 2010, which is incorporated by reference herein.

BACKGROUND

1. Technical Field

The present invention relates to an image forming device, and in particular, to an image forming device that suppresses banding due to landing interference.

2. Related Art

In an inkjet image forming device, when droplets land on places on the surface of a recording medium such as a sheet or the like at which places droplets that have landed remain, the droplets (dots) that landed previously and the droplets that land thereafter interfere with one another, and the droplets move. This is because the surface energy of two droplets that have landed is small, or is due to the overflowing effect caused by the amount of ink per unit surface area being large. There is the problem that the offset of droplets from their ideal landing positions causes offset in the density distribution that is visually perceived as banding.

In order to overcome this problem, sheets that are specially used for inkjet printing that have a water-absorbing layer are used. In this case, interference between droplets is suppressed because the droplets are quickly absorbed by the sheet specially used for inkjet printing. However, on the other hand, there is the problem that the cost of these sheets that are specially used for inkjet printing is high. Further, there are cases in which image formation is carried out in multiple passes in order to ensure the time for absorption and drying of the dots. However, in this case, the productivity becomes problematic.

Further, in order to improve the productivity, in recent years there have been proposed inkjet printers in accordance with a single-pass method that carry out image formation by the scanning of a single time. In printers using this method, the differences in the landing times of the respective dots are short. Accordingly, banding that is caused by interference between droplets is even more severe.

In relation to the above-described techniques, Japanese Patent Application Laid-Open (JP-A) No. 5-104726 discloses a technique of making the dot mass small in order for the respective dots to not contact one another. JP-A No. 11-151821 discloses a technique of making the brightness of small dots of a high concentration of ink and large dots of a low concentration of ink be the same at intermediate tones. Further, JP-A No. 2006-123522 discloses a technique of changing the landing order in accordance with the overlapping with adjacent dots, and setting the landing time difference to exceed the fixing time.

JP-A No. 2009-154499 discloses a technique of disposing large dots, that cause beading, in the form of a mesh or the form of a line at a fixed pitch so as to avoid beading.

However, in the technique disclosed in JP-A No. 5-104726, when the dots are small, the interval between respective dots widens. Accordingly, it is easy for stripes to become conspicuous (because overlapping is eliminated). When the resolution is increased in order to avoid this drawback, the productivity decreases in the case of multiscanning.

Using different inks as in the technique disclosed in JP-A No. 11-151821 is related to an increase in costs and increased complexity of the device. Further, changing the landing order as in the technique disclosed in JP-A No. 2006-123522 is linked to increased complexity of the device. Moreover, setting the landing time difference to exceed the fixing time leads to a decrease in the productivity.

In addition, if the dots are disposed cyclically as in the technique of JP-A No. 2009-154499, the dots are affected by poor ejection, and it is easy for banding to arise.

In this way, conventional techniques have the problem that banding due to landing interference cannot be suppressed.

SUMMARY

In view of the above-described problems, an object of the present invention is to provide an image forming device that can suppress banding due to landing interference.

An image forming device relating to an aspect of the present invention includes: a droplet ejecting head that ejects droplets with respect to a recording medium, and that can form plural dots of different diameters; and a control unit that, on the basis of image data expressing a tone value of each pixel in an image that is to be formed on the recording medium, controls sizes of droplets ejected from the droplet ejecting head such that, in a case in which the tone value is within a predetermined tone range, first dots, whose diameter is greater than a predetermined diameter, are formed at a recording rate that satisfies following formula (1), and second dots, whose diameter is less than or equal to the predetermined diameter, are formed at a recording rate corresponding to the tone value:

[Numerical Expression 1]

$$\sum_{i>i_s} \alpha_i R_i (D_i / L)^2 = 1 \tag{1}$$

wherein i is a number from 1 to N that is given to respective dots in order from a smallest diameter with a number a number of plural types of dot diameters being N, $\alpha_i$ is a coefficient that satisfies $\pi/4 \leqq \alpha_i \leqq 1$ of an ith dot, $R_i$ is a recording rate of the ith dot, $D_i$ is a diameter of the ith dot, L is a length of one side of a pixel, and $i_s$ is a number of a dot of the predetermined diameter.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described in detail hereinafter with reference to the drawings. Note that, in the following explanation, there are cases in which droplets are called ink, and further, ink that has landed on a recording medium is called dots.

Figure 1:
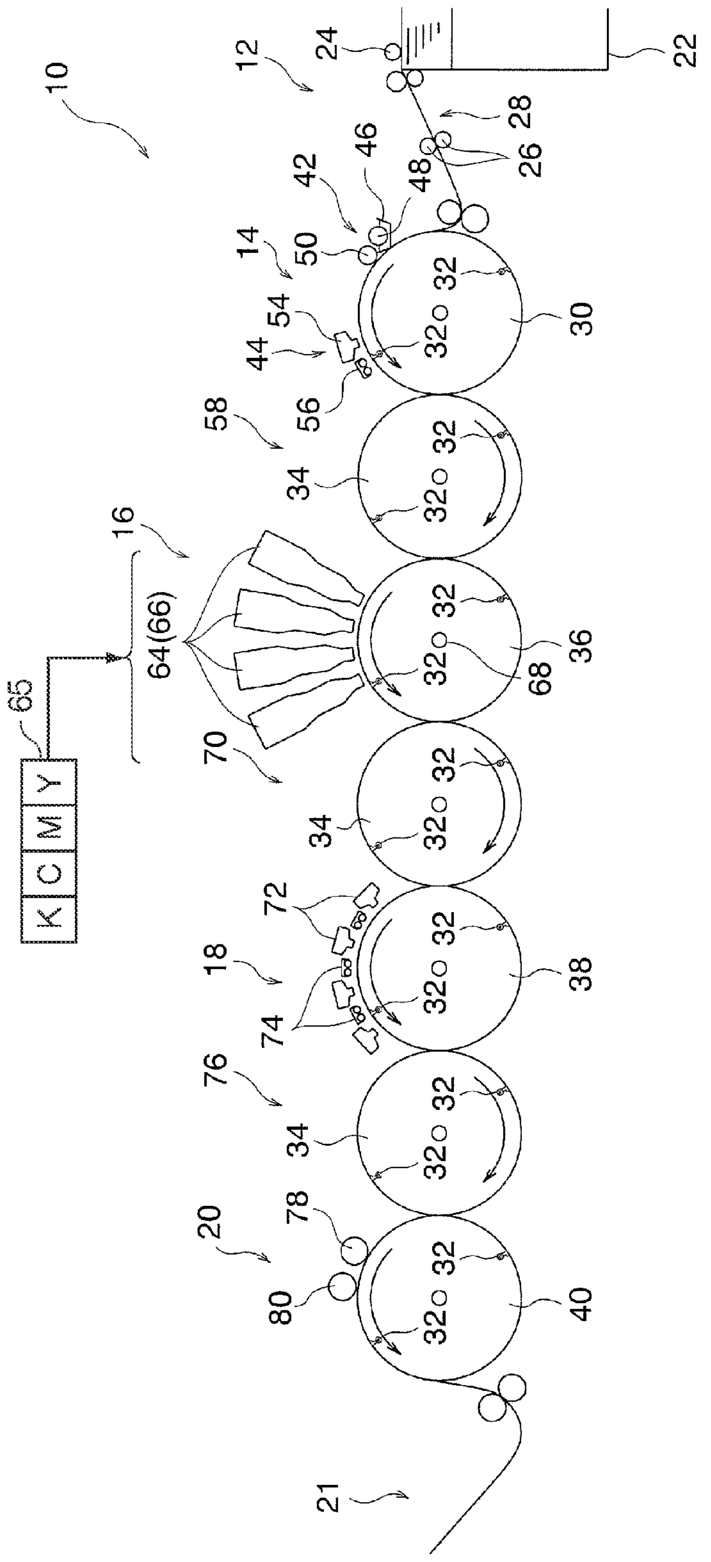
FIG. 1 is a side view showing the overall structure of an inkjet recording device relating to the exemplary embodiment.

An overall structural drawing of an inkjet recording device that illustrates an embodiment of an image forming device of the present invention is shown in FIG. 1. As shown in FIG. 1, a feeding/conveying section 12 that feeds and conveys sheets P is provided at an inkjet recording device 10, at the upstream side in the conveying direction of the sheets P that serve as recording media. Provided along the sheet conveying direction of the sheets P at the downstream side of the feeding/conveying section 12 are: a processing liquid coating section 14 that coats a processing liquid on an image recording surface (hereinafter also called "recording surface") of the sheet P, an image recording section 16 that records an image on the recording surface of the sheet P, an ink drying section 18 that dries the image recorded on the recording surface, an image fixing section 20 that fixes the dried image to the sheet P, and a discharging section 21 that discharges the sheet P on which the image is fixed.

A stacking section 22 in which the sheets P are stacked is provided at the feeding/conveying section 12. A sheet feed portion 24, that feeds one-by-one the sheets P that are stacked in the stacking section 22, is provided at the upper portion of the stacking section 22. A conveying portion 28, that is structured to include plural pairs of rollers 26, is provided at the downstream side in the conveying direction of the sheets P (hereinafter shortened to "sheet P conveying direction" upon occasion) of the sheet feed portion 24. The sheet P that is fed by the sheet feed portion 24 is conveyed to the processing liquid coating section 14 via the conveying portion 28 that is structured by the plural pairs of rollers 26.

A processing liquid coating drum 30 is disposed at the processing liquid coating section 14 so as to be rotatable. Holding members 32, that nip the leading end portions of sheets P and hold the sheets P, are provided at the processing liquid coating drum 30. In the state in which the sheet P is held at the surface of the processing liquid coating drum 30 via the holding member 32, that sheet P is conveyed downstream by the rotation of the processing liquid coating drum 30.

Note that, in the same way as at the processing liquid coating drum 30, the holding members 32 are provided at intermediate conveying drums 34, an image recording drum 36, an ink drying drum 38 and a fixing drum 40 that are described below. The transfer of the sheet P from a drum at the upstream side to a drum at the downstream side is carried out by the holding members 32.

A processing liquid coating device 42 and a processing liquid drying device 44 are disposed along the peripheral direction of the processing liquid coating drum 30 at the upper portion of the processing liquid coating drum 30. Processing liquid is coated onto the recording surface of the sheet P by the processing liquid coating device 42, and the processing liquid is dried by the processing liquid drying device 44.

The processing liquid reacts with ink, aggregates the color material (pigment), and has the effect of promoting separation of the color material (pigment) and the solvent. A storing portion 46, in which the processing liquid is stored, is provided at the processing liquid coating device 42, and a portion of a gravure roller 48 is soaked in the processing liquid.

A rubber roller 50 is disposed so as to press-contact the gravure roller 48. The rubber roller 50 contacts the recording surface side of the sheet P such that the processing liquid is coated thereon. Further, a squeegee (not shown) contacts the gravure roller 48. The processing liquid coating amount that is coated on the recording surface of the sheet P is controlled by the squeegee.

It is ideal that the film thickness of the processing liquid is sufficiently smaller than the droplet ejected by the head. For example, if the ejected droplet amount is 2 pl, the average diameter of the droplet ejected by the head is 15.6 um. In a case in which the film thickness of the processing liquid is thick, the ink dot floats within the processing liquid without contacting the recording surface of the sheet. It is preferable to make the film thickness of the processing liquid be less than or equal to 3 um in order to obtain a landed dot diameter of greater than or equal to 30 um at an ejected droplet amount of 2 pl.

On the other hand, at the processing liquid drying device 44, a hot air nozzle 54 and an infrared heater 56 (hereinafter called "IR heater 56") are disposed near to the surface of the processing liquid coating drum 30. The solvent such as water or the like within the processing liquid is vaporized by the hot air nozzle 54 and the IR heater 56, and a solid or thin-film processing liquid layer is formed on the recording surface side of the sheet P. By making the processing liquid be a thin layer in the processing liquid drying process, the dots formed by the ejection of ink at the image recording section 16 contact the surface of the sheet P such that the necessary dot diameter is obtained, and the actions of reacting with the processing liquid that has been made into a thin layer, aggregating the color material, and fixing to the surface of the sheet P are easily obtained.

The sheet P, on whose recording surface the processing liquid has been coated and dried at the processing liquid coating section 14 in this way, is conveyed to an intermediate conveying section 58 that is provided between the processing liquid coating section 14 and the image recording section 16.

The intermediate conveying drum 34 is provided at the intermediate conveying section 58 so as to be rotatable. The sheet P is held at the surface of the intermediate conveying drum 34 via the holding member 32 provided at the intermediate conveying drum 34, and this sheet P is conveyed downstream by the rotation of the intermediate conveying drum 34.

The image recording drum 36 is provided at the image recording section 16 so as to be rotatable. The sheet P is held at the surface of the image recording drum 36 via the holding member 32 provided at the image recording drum 36, and this sheet P is conveyed downstream by the rotation of the image recording drum 36.

Head units 66, that are structured by single-pass inkjet line heads (hereinafter simply called "heads" upon occasion) 64, are disposed at the upper portion of the image recording drum 36 so as to be near the surface of the image recording drum 36.

At the head units 66, the heads 64 of at least YMCK that are basic colors are arrayed along the peripheral direction of the image recording drum 36, and record images of the respective colors on the processing liquid layer that was formed on the recording surface of the sheet P at the processing liquid coating section 14.

The processing liquid has the effect of making the color material (pigment) and the latex particles that are dispersed within the ink aggregate in the processing liquid, and forms aggregates at which flowing of the color material and the like do not arise on the sheet P. As an example of the reaction between the ink and the processing liquid, by using a mechanism in which pigment dispersion is destroyed and aggregates are formed by including an acid within the processing liquid and lowering the pH, running of the color material and color mixing between the inks of the respective colors are avoided.

The heads 64 carry out ejecting of droplets synchronously with an encoder (not illustrated) that is disposed at the image recording drum 36 and detects the rotating speed. Due thereto, the landing positions are determined highly accurately, and non-uniformity of droplet ejection can be reduced independently of deviations of the image recording drum 36, the precision of a rotating shaft 68, and the surface speed of the drum.

The head units 66 can be withdrawn from the upper portion of the image recording drum 36. Maintenance operations such as cleaning of the nozzle (ejection opening) surfaces of the heads 64, expelling of ink whose viscosity has increased, and the like are carried out by withdrawing the head units 66 from the upper portion of the image recording drum 36.

The inkjet recording device 10 has an ink storing/loading section 65 that stores the inks that are to be supplied to the respective heads 64 of YMCK. The ink storing/loading section 65 has ink tanks that store inks of the colors corresponding to the respective heads 64 of YMCK. The respective tanks communicate with the heads 64 of YMCK via predetermined pipe conduits.

Due to the rotation of the image recording drum 36, the sheet P, on whose recording surface an image is recorded at the image recording section 16, is conveyed to an intermediate conveying section 70 that is provided between the image recording section 16 and the ink drying section 18. Because the structure of the intermediate conveying section 70 is substantially the same as that of the intermediate conveying section 58, description thereof is omitted.

The ink drying drum 38 is provided at the ink drying section 18 so as to be rotatable. Plural hot air nozzles 72 and IR heaters 74 are disposed at the upper portion of the ink drying drum 38 so as to be near the surface of the ink drying section 18.

Here, as an example, the hot air nozzles 72 are disposed at the upstream side and the downstream side, and pairs of IR heaters 74 that are lined-up in parallel are disposed alternately with the hot air nozzles 72. Other than this, a large number of the IR heaters 74 may be disposed at the upstream side and a large amount of thermal energy may be irradiated and the temperature of the moisture may be raised at the upstream side, whereas, at the downstream side, a large number of the hot air nozzles 72 may be disposed and the saturated water vapor may be blown-away.

Here, the hot air nozzles 72 are disposed such that the angle at which the hot air is blown out is inclined toward the trailing end side of the sheet P. Due thereto, the flow of hot air from the hot air nozzles 72 can be collected in one direction. Further, the sheet P can be pushed against the ink drying drum 38, and the state in which the sheet P is held at the surface of the ink drying drum 38 can be maintained.

Due to the warm air from the hot air nozzles 72 and the IR heaters 74, at the portion of the sheet P where the image is recorded, the solvent that was separated by the color material aggregating action is dried, and a thin-film image layer is formed.

The temperature of the warm air differs in accordance with the conveying speed of the sheet P as well. Due to the temperature of the warm air usually being set to 50° C. to 70° C. and the temperature of the IR heaters 74 being set to 200° C. to 600° C., the ink surface temperature is set to become 50° C. to 60° C. The evaporated solvent is discharged to the exterior of the inkjet recording device 10 together with air, and the air is discharged. This air may be cooled by a cooler/radiator or the like, and discharged as a liquid.

Due to the rotation of the ink drying drum 38, the sheet P, on whose recording surface the image is dried, is conveyed to an intermediate conveying section 76 that is provided between the ink drying section 18 and the image fixing section 20. Because the structure of the intermediate conveying section 76 is substantially the same as that of the intermediate conveying section 58, description thereof is omitted.

The image fixing drum 40 is provided at the image fixing section 20 so as to be rotatable. At the image fixing section 20, the latex particles within the image layer, that is a thin layer that was formed on the ink drying drum 38, are subjected to heat and pressure and are fused, and the image fixing section 20 has the function of fixing the image on the sheet P.

A heating roller 78 is disposed at the upper portion of the image fixing drum 40 so as to be near the surface of the image fixing drum 40. At the heating roller 78, a halogen lamp is built-in within a metal pipe of aluminum or the like that has good thermal conductivity. Thermal energy of greater than or equal to the Tg temperature of latex is provided by the heating roller 78. Due thereto, the latex particles fuse, and push-in fixing into the indentations and protrusions on the sheet is carried out, and the unevenness of the surface of the image is leveled, and glossiness can be obtained.

A fixing roller 80 is provided at the downstream side of the heating roller 78. The fixing roller 80 is disposed in a state of press-contacting the surface of the image fixing drum 40, and nipping force is obtained between the fixing roller 80 and the image fixing drum 40. Therefore, at least one of the fixing roller 80 and the image fixing drum 40 has an elastic layer at the surface thereof, and has a uniform nip width with respect to the sheet P.

The sheet P, on whose recording surface an image is fixed by the above-described processes, is conveyed by the rotation of the image fixing drum 40 toward the discharging section 21 that is provided at the downstream side of the image fixing section 20.

Note that the image fixing section 20 is described in the present exemplary embodiment. However, it suffices to be able to, at the ink drying section 18, dry and fix the image that is formed on the recording surface. Therefore, the image fixing section 20 is not absolutely necessary.

The system structure of the inkjet recording device 10 relating to the present exemplary embodiment will be described next with reference to FIG. 2.

Figure 2:
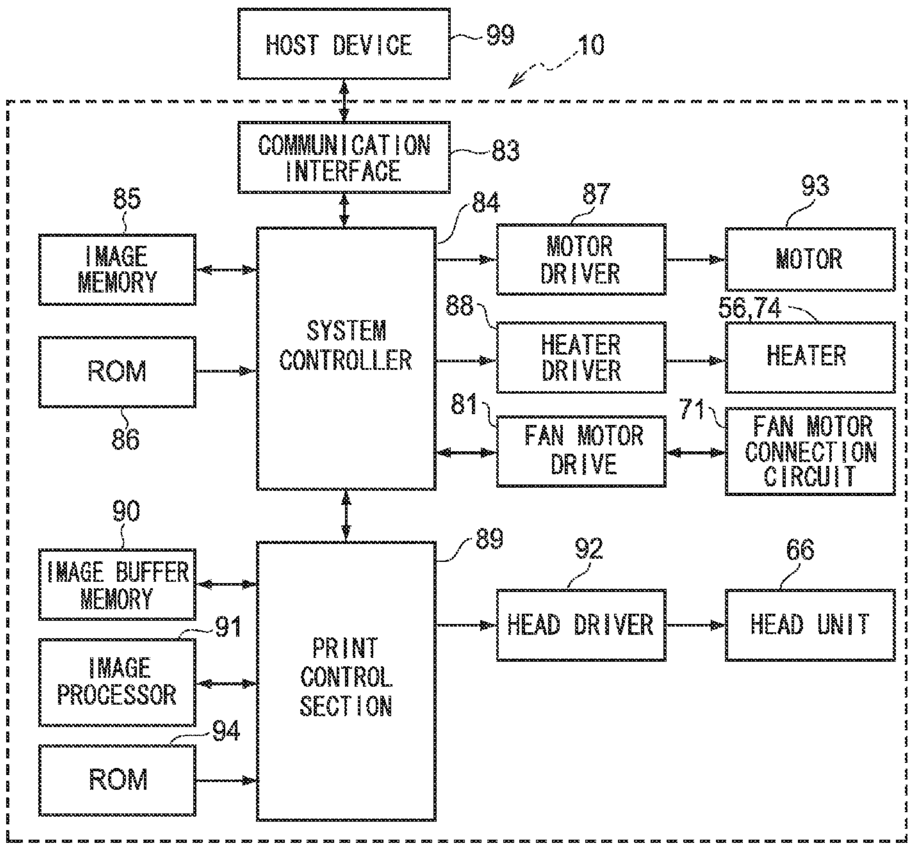
FIG. 2 is a drawing showing the system structure of the inkjet recording device.

As shown in FIG. 2, the inkjet recording device 10 has a communication interface 83, a system controller 84, an image memory 85, a ROM 86, a motor driver 87, a heater driver 88, a fan motor driver 81, a print control section 89, a ROM 94, an image buffer memory 90, an image processor 91, a head driver 92, and the like.

The communication interface 83 is an interface section with a host device 99 that a user uses for carrying out instructing of image formation and the like with respect to the inkjet recording device 10, and the like. A serial interface such as a USB (Universal Serial Bus), IEEE 1394, an ETHERNET®, a wireless network or the like, or a parallel interface such as centronics or the like, can be used as the communication interface 83. A buffer memory (not illustrated) for making the communication be high-speed may be installed in this portion.

Image data sent-out from the host device 99 is fetched by the inkjet recording device 10 via the communication interface 83, and is once stored in the image memory 85. The image memory 85 is a storage that stores image data that has been inputted via the communication interface 83. Reading and writing of data from and to the image memory 85 are carried out through the system controller 84. The image memory 85 is not limited to a memory formed from a semiconductor element, and a magnetic medium such as a hard disk or the like may be used.

The system controller 84 is structured by a central processing unit (CPU), peripheral circuits thereof, and the like. The system controller 84 functions as a control device that controls the overall inkjet recording device 10 in accordance with predetermined programs, and functions as a computing device that carries out various types of computation. Namely, the system controller 84 controls respective sections such as the communication interface 83, the image memory 85, the motor driver 87, the heater driver 88, the fan motor driver 81, and the like, and carries out control of communication with the host device 99, control of reading and writing from and to the image memory 85 and the ROM 86, and the like, and generates control signals that control motors 93 of the sheet conveying system and the IR heaters 56, 74. Note that, in addition to control signals, the system controller 84 transmits image data that is stored in the image memory 85 to the print control section 89.

Programs that the CPU of the system controller 84 executes, various types of data that are needed for control, and the like are stored in the ROM 86. The ROM 86 may be a non-rewritable storage. However, in a case in which the various types of data are updated as needed, it is preferable to use a rewritable storage such as an EEPROM as the ROM 86.

The image memory 85 is used as a temporary storage region of image data, and is also used as a program expansion region and as a computing work region of the CPU.

The motor driver 87 is a driver (driving circuit) that drives the motors 93 of the sheet conveying system in accordance with instructions from the system controller 84. Further, the heater driver 88 is a driver that drives the IR heaters 56, 74 in accordance with instructions from the system controller 84.

The fan motor driver 81 is a driver that drives respective fan motors 73 and a fan motor connecting circuit 71 in accordance with instructions from the system controller 84.

On the other hand, the print control section 89 is structured from a CPU, peripheral circuits thereof, and the like. In accordance with control of the system controller 84, the print control section 89 carries out, in cooperation with the image processor 91, processings such as various types of manipulations, corrections and the like for generating signals for ejection control from the image data within the image memory 85, and supplies generated ink ejection data to the head driver 92 so as to control the ejection driving of the head units 66.

The ROM 94, in which are stored programs that the CPU of the print control section 89 executes and various types of data needed for control and the like, is connected to the print control section 89. The ROM 94 also may be a non-rewritable storage. However, in a case in which the various types of data are updated as needed, it is preferable to use a rewritable storage such as an EEPROM as the ROM 94.

The image processor 91 generates dot placement data per ink color from the inputted image data. The image processor 91 carries out halftone processing (intermediate tone processing) on inputted image data, and determines high-quality dot positions.

Note that, in FIG. 2, the image processor 91 is illustrated as being a structure separate from the system controller 84 and the print control section 89. However, for example, the image processor 91 may be included in the system controller 84 or the print control section 89 and may structure a portion thereof.

Further, the print control section 89 has an ink ejection data generating function that generates ejection data of the ink (control signals of the actuators corresponding to the nozzles of the heads 64) on the basis of dot placement data that corresponds to the recording rate and that is generated at the image processor 91, and has a driving waveform generating function.

The ink ejection data generated by the ink ejection data generating function is provided to the head driver 92, and the ink ejecting operations of the head units 66 are controlled.

The image buffer memory 90 is provided at the print control section 89. Data, such as image data and parameters and the like, is temporarily stored in the image buffer memory 90 at the time of the image data processing at the print control section 89. In particular, the image buffer memory 90 is a storage that stores image data expressing tone values of the respective pixels of the image that is to be formed on the sheet. Note that FIG. 2 illustrates a form in which the image buffer memory 90 is appended to the print control section 89. However, the image buffer memory 90 may also serve as the image memory 85.

Further, a form in which the print control section 89 and the system controller 84 are consolidated and structured by a single processor also is possible.

Figure 3:
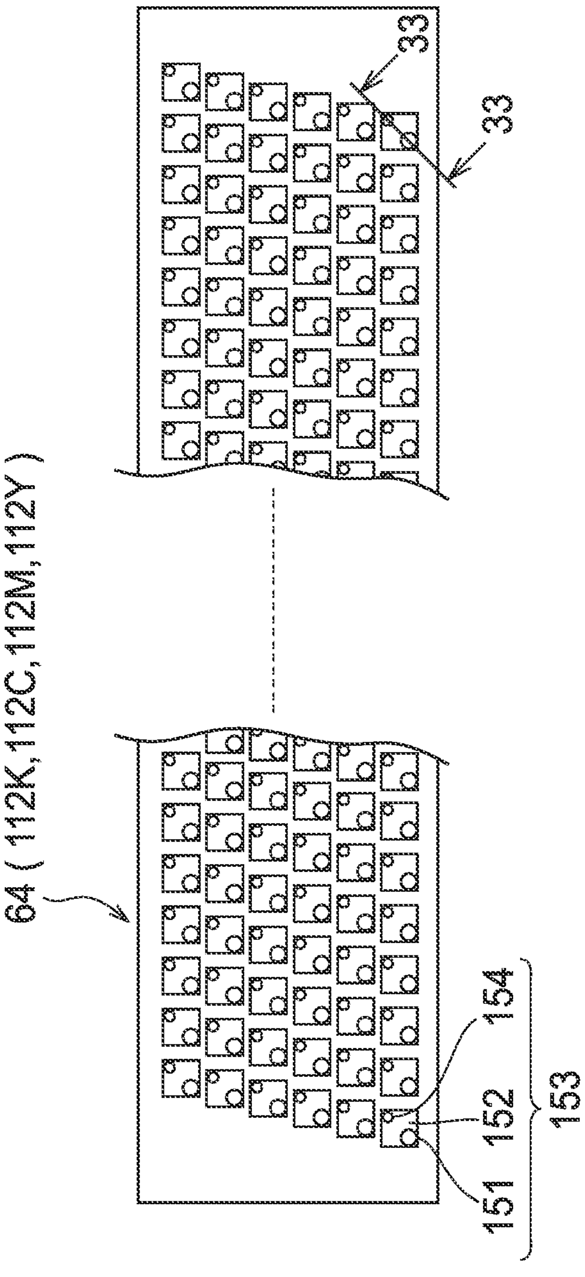
FIG. 3 is a transparent plan view showing a structural example of a head.

FIG. 3 is a transparent plan view showing a structural example of the head 64. In order to make the dot pitch that is printed on the sheet be high-density, the nozzle pitch at the head 64 must be made to be high-density. The head 64 of the present example has a structure in which plural ink chamber units (droplet ejecting elements) 153, that are formed from nozzles 151 that are ink ejecting openings, pressure chambers 152 corresponding to the respective nozzles 151, and the like, are disposed so as to be staggered and in the form of a matrix (two-dimensionally). Due thereto, a high density of the substantial nozzle interval (projected nozzle pitch) that is projected so as to be lined-up along the head longitudinal direction (a direction orthogonal to the sheet feeding direction) is achieved. Further, the head 64 ejects ink that enables formation of dots of plural diameters.

In this way, at the head 64, the plural nozzles 151 that eject ink droplets are provided so as to be lined-up in the conveying direction of the sheet on which the ink droplets are to be ejected, and in an intersecting direction that intersects the conveying direction.

Figure 4:
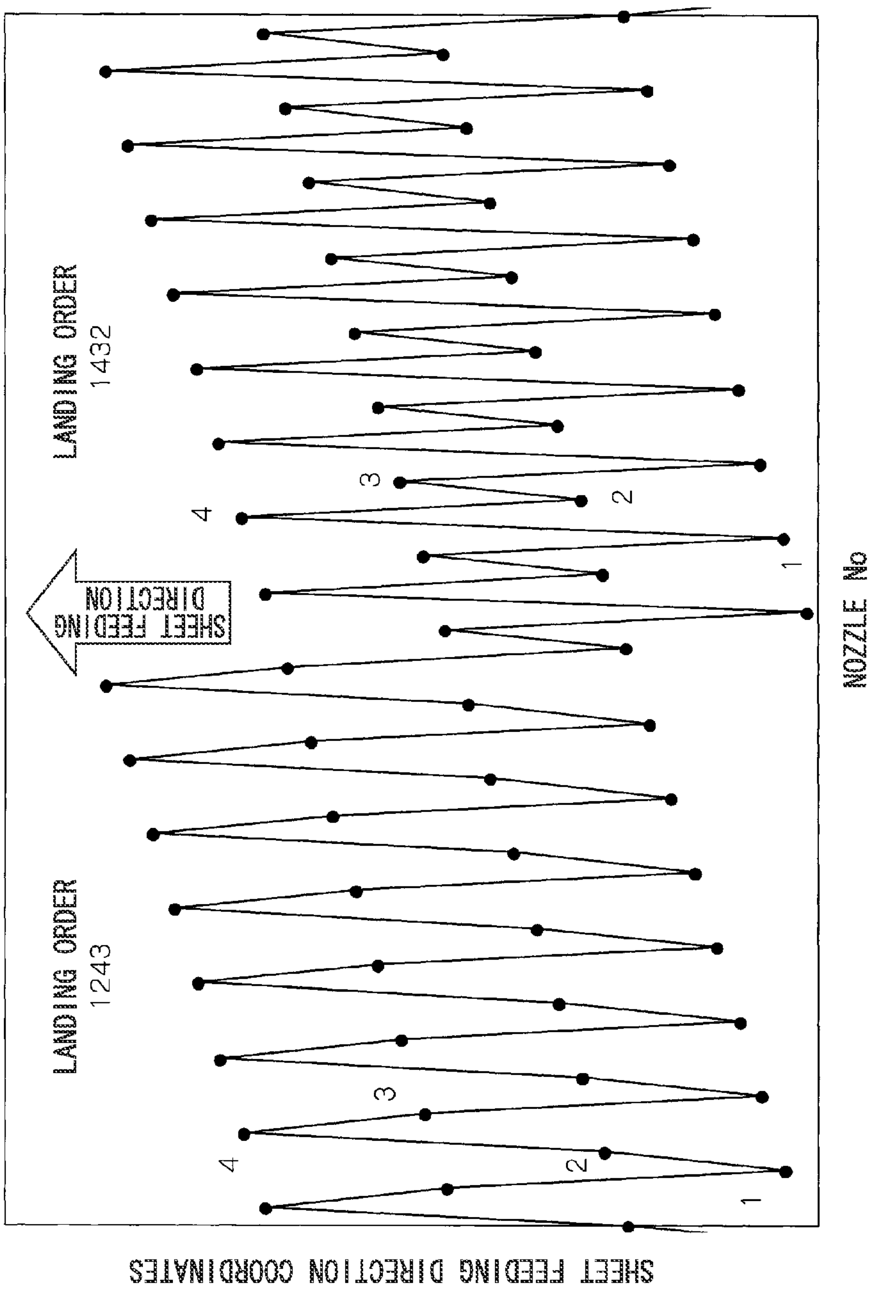
FIG. 4 is a drawing showing an example of the nozzle layout and an example of the landing order.

At the head 64 such as shown in FIG. 3, it is easy for banding due to landing interference to arise. First, the movement of dots due to the occurrence of landing interference is explained. FIG. 4 is a drawing showing the order of ejection by the nozzles 151, i.e., the order of landing of the droplets.

Locality arises in the landing order due to the nozzles 151 being distributed in the feeding direction as shown in FIG. 3. FIG. 4 shows, at the left side of the drawing, the landing of droplets in the order of nozzle numbers 1, 2, 4, 3, and, at the right side of the drawing, the landing of droplets in the order of nozzle numbers 1, 4, 3, 2. In this way, even at the same head 64, there are often cases in which the order is slightly different at local portions.

In the case of the arrangement of the nozzles 151 shown in FIG. 4, locality arises in the landing order between pixels that are adjacent in the lateral direction. In landing interference, dots that are ejected later move with respect to dots that were ejected previously, and therefore, locality of the landing order causes banding.

Figure 5:
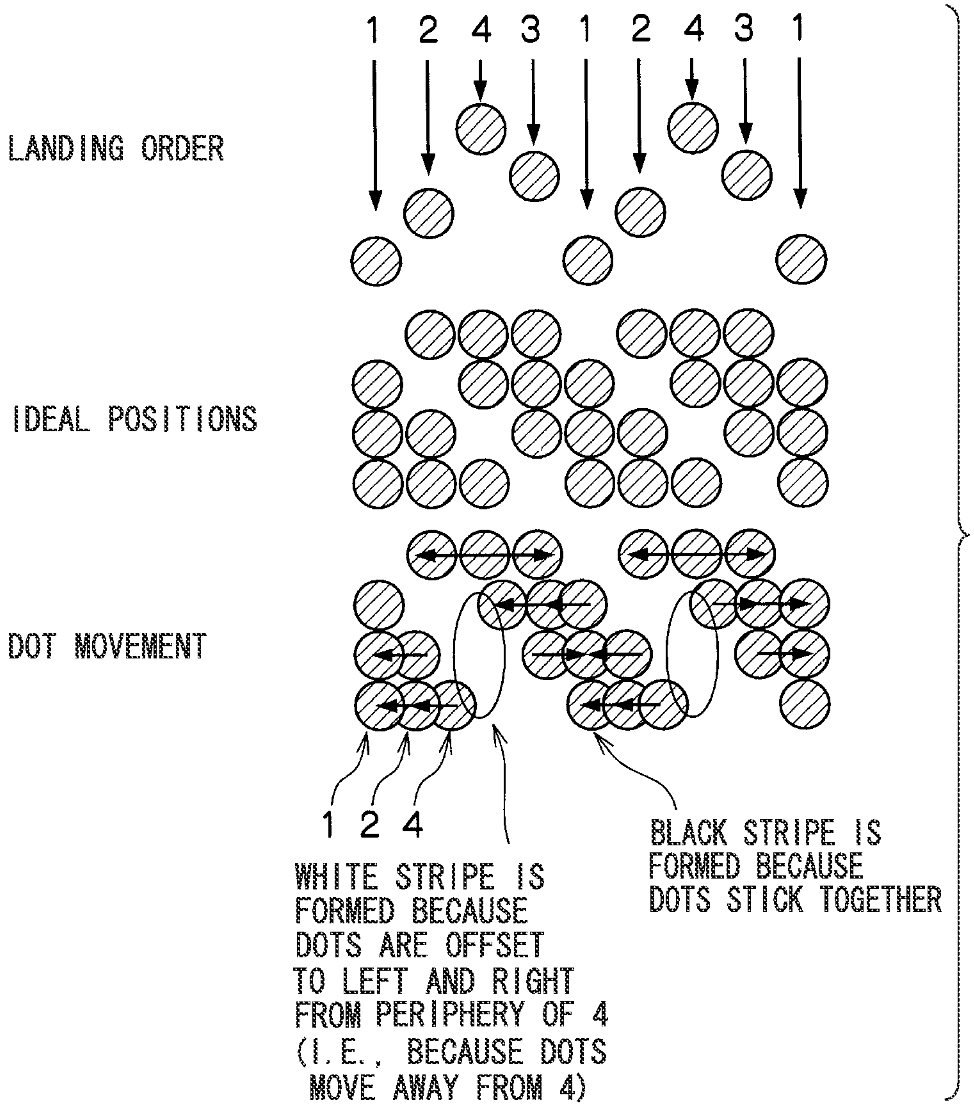
FIG. 5 is a drawing showing dots in a case in which the recording rate is made to be 75%.

Dots in a case in which the recording rate is made to be 75% are shown in FIG. 5. FIG. 5 shows the dot landing order, the ideal landing positions of the dots, and the state of dot movement in a case in which dots actually land. As shown by the dot movement, for example, with three dots to which an order has been assigned, the dot that lands second moves toward the dot that landed first, and the dot that lands fourth (the third dot in this row) moves toward this dot that lands second. When the dots move in this way, a white stripe arises at the place where the landing order is four, and a black stripe arises at the place where the landing order is one.

The basic principles of the present invention are described next. Note that the present invention is a halftone processing method that is suited to the single-pass inkjet recording device 10 that can eject multi-level droplet sizes. The inputted image data is converted into droplet ejection data of multiple values. Note that the method of the multi-level halftone processing does not matter. However, in the case of a single-pass method, it is easy for dispersion in ejection of the respective nozzles 151 to affect the image quality. In particular, if the AM screening method is used, it is easy for the banding to become conspicuous due to the cyclicality of the mesh. Accordingly, the FM screening method is more suitable.

Figure 6A:
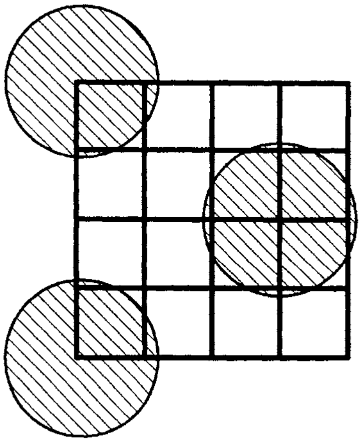
FIG. 6A is a schematic drawing showing the basic principles of the present invention.
Figure 6B:
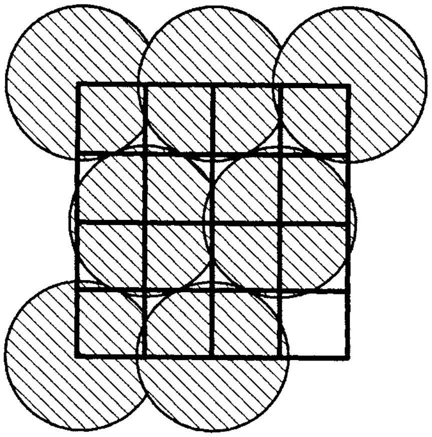
FIG. 6B is a schematic drawing showing the basic principles of the present invention.
Figure 6C:
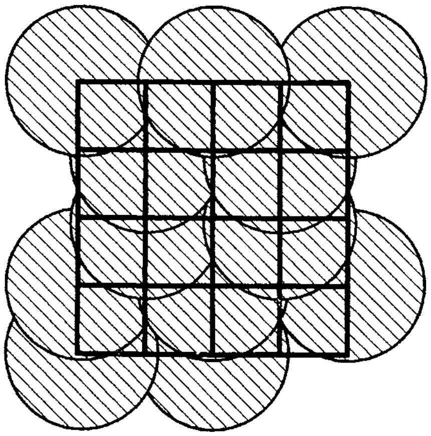
FIG. 6C is a schematic drawing showing the basic principles of the present invention.

The feature of the present invention is the method of setting the recording rate. The basic principles of this method are described by using FIGS. 6A, 6B, 6C. Three types of patterns that are formed by large droplets, among two types of dots that are dots D2 that are large droplets and dots D1 that are small droplets, are shown in FIG. 6A, 6B, 6C. Thereamong, the pattern shown in FIG. 6A is a pattern in which the dots do not contact one another at all. The pattern shown in FIG. 6B is a pattern in the case of a recording rate at which the dots just about contact one another (a recording rate at which the dots cover the entirety without hardly contacting one another at all). The pattern shown in FIG. 6C is a pattern in which the dots overlap one another at a relative high proportion.

Figure 7B:
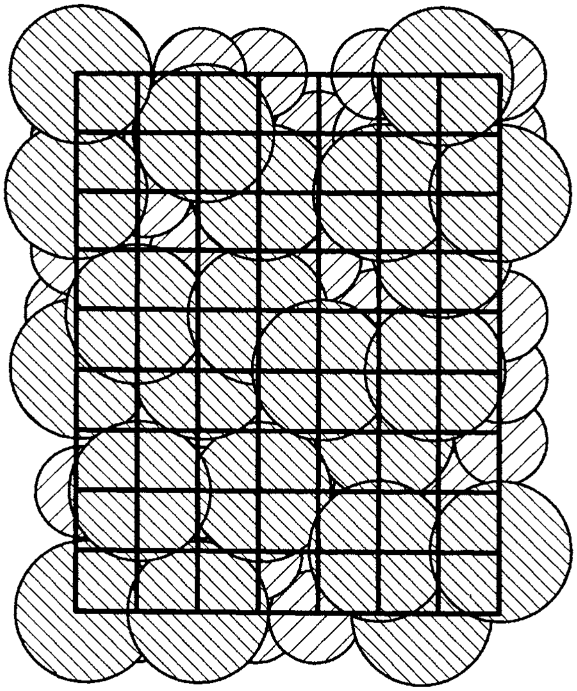
FIG. 7B is a drawing showing a state in which dots D1 are formed in gaps between dots D2.
Figure 7A:
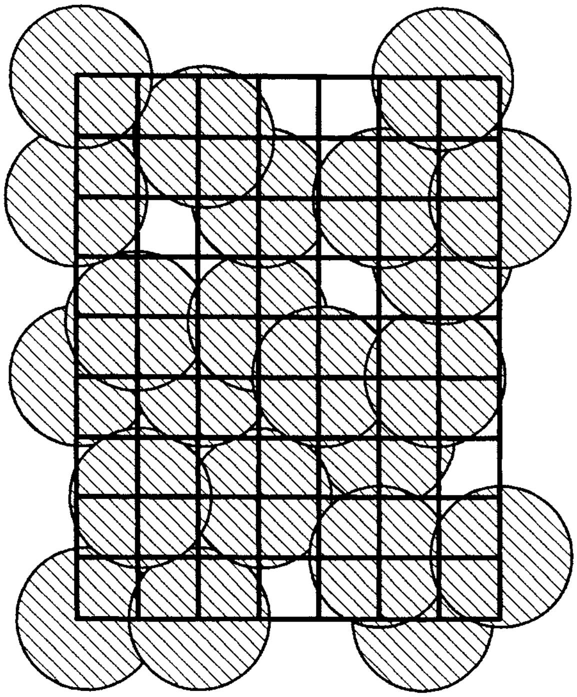
FIG. 7A is a drawing showing a state in which only dots D2 are formed.

In the present invention, in the pattern shown in FIG. 6B, the dots D2 are formed. Then, the dots D1 are formed in the gaps between the dots D2. More concretely, the recording rate by the dots D2 is set such that the dots D2 are formed in the pattern shown in FIG. 7A, and the recording rate by the dots D1 is set so that the dots D1 are formed, in accordance with the tone value, in the gaps between the formed dots D2. In a case in which the dots D1 and the dots D2 are formed in this way, the dots D2 do not cause dot movement because the dots D2 do not interfere with one another. Further, although the dots D2 and D1 interfere with one another, the dots D2 have a larger mass, and therefore, do not bring about movement and do not cause banding. On the other hand, the dots D1 move due to interference among the dots D1 or with the dots D2 and can become a cause of banding. However, because the dots D2, that cover the entire surface and do not cause movement, hide the movement of the dots D1, the banding is not visually perceived.

Figure 8:
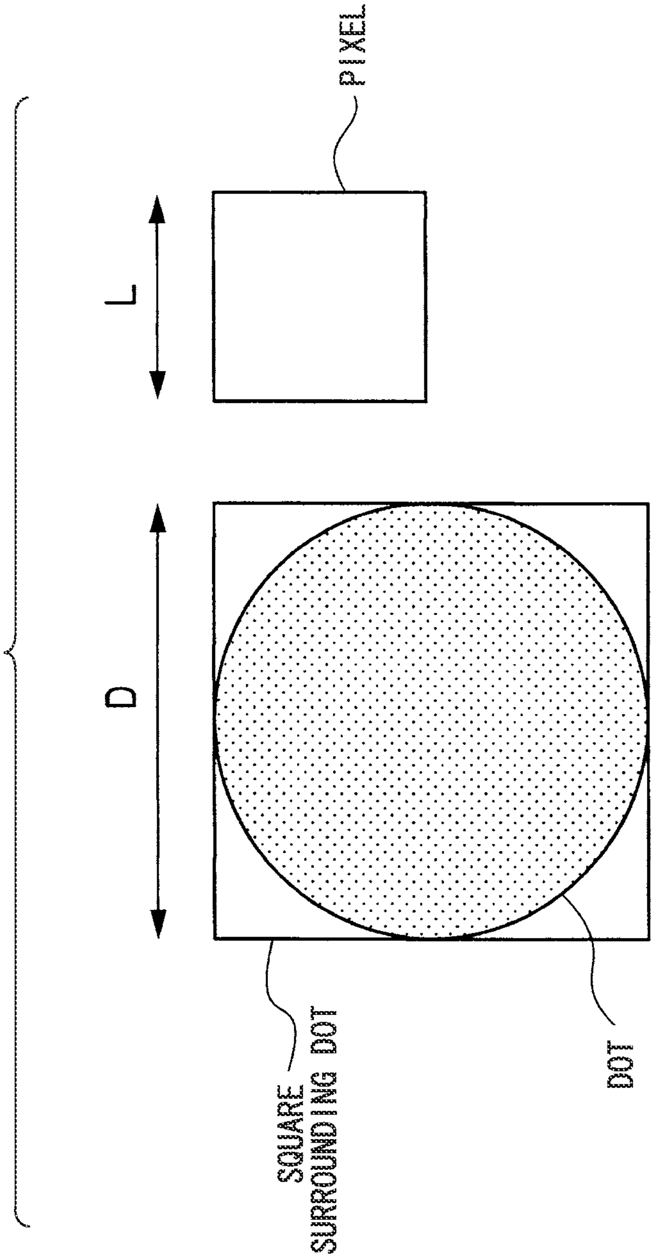
FIG. 8 is a drawing for explaining a method of setting the recording rate by the dots D2.

First, the setting of the recording rate by the dots D2 is described by using numerical expressions. For simplicity, a case in which there are two types of dot sizes is assumed. A dot, a pixel, and the smallest square that surrounds the dot are shown in FIG. 8. Recording rate R of the dots D2 is a "recording rate at which the dots just about contact one another". Namely, the recording rate R of the dots D2 is a recording rate that satisfies "recording rate×surface area of dot=surface area of pixel of length L". Here, L is the length of the pixel that is prescribed by the printing resolution, and, in the case of 1200 dpi, is 21.17 um. Here, when the surface area of the dot=a circle of diameter (dot diameter) D, the "recording rate R at which the dots just about contact one another" satisfies following numerical expression 4.

$$R\pi\left(\frac{D}{2}\right)^2 = L^2 \Rightarrow \left(\frac{\pi}{4}\right)R\left(\frac{D}{L}\right)^2 = 1 \quad \text{[Numerical Expression 4]}$$

In actuality, a dot can only be placed only on a grid point (a pixel) whose one side is L. Accordingly, when the dots are formed at a recording rate that is calculated at "surface area of dot=circle of diameter D", the probability that the dots D2 will contact one another becomes high. Further, whether or not the dots will move due to interference depends as well on the properties of the ink. Therefore, the "recording rate at which the dots just about contact one another" in a case in which the surface area of the dot=the square that circumscribes the dot is computed, and this is the lower limit of the "recording rate at which the dots just about contact one another".

$$RD^2 = L^2 \Rightarrow R\left(\frac{D}{L}\right)^2 = 1 \quad \text{[Numerical Expression 5]}$$

In numerical expression 4, the coefficient (which will be called a) of the product of the recording rate R and the surface area ratio is π/4, and in numerical expression 5, the coefficient of the product of the recording rate R and the surface area ratio is 1. Accordingly, if α is greater than or equal to π/4 and less than or equal to 1, there is a recording rate at which the dots just about contact one another. Accordingly, the recording rate R can be expressed as a formula that satisfies following numerical expression 6.

$$\alpha R\left(\frac{D}{L}\right)^2 = 1 \; (\pi/4 \leq \alpha \leq 1) \quad \text{[Numerical Expression 6]}$$

When this numerical expression 6 is expanded and generalized for plural dots of different diameters, there becomes the formula expressed by numerical expression 7. Note that, in numerical expression 7, there are N types of dots (N values: N types of diameters), and the first dots indicate dots of a size that is larger than a predetermined size. For example, in the case of three values (no droplet, small droplet, large droplet), the dots that are formed by the large droplets may be made to correspond to the first dots.

$$\sum_{i>i_s} \alpha_i R_i (D_i/L)^2 = 1 \; (\pi/4 \leq \alpha_i \leq 1) \quad \text{[Numerical Expression 7]}$$

wherein i is an integer that satisfies (1≦i≦N), $D_i$ is the diameter of dot i (1≦i≦N) (where $D_1<D_2 \ldots <D_{N-1}<D_N$), the first dots are $D_i$: $i_s<i$ ($i_s \neq N$), L is the length of one side of the pixel, and $R_i$ is the recording rate of dot i.

In this way, i is a number from 1 to N that is given to the respective dots in order from the smallest diameter, where the number of plural types of dot diameters is N, $\alpha_i$ is a coefficient that satisfies $\pi/4 \leqq \alpha_i \leqq 1$ of the ith dot, $R_i$ is the recording rate of the ith dot, $D_i$ is the diameter of the ith dot, L is the length of one side of the pixel, and $i_s$ is the number of the dots of the aforementioned predetermined diameter.

By using this numerical expression 7, the recording rate by the first dots is set, and the recording rate by the second dots is set such that the second dots, that are of a size that is less than or equal to a predetermined size, are formed in accordance with the tone value in the gaps between the formed first dots.

By forming dots by the recording rates that are set in this way, banding and the amount of ink can be curbed. The reasons for this are explained. When using a recording rate that is such that relatively large dots (in terms of numerical expression 7, the first dots) contact one another, the first dots that contact one another move due to interference and banding arises. On the other hand, when the recording rate by the first dots is set lower than needed, dot movement due to interference between the relatively small second dots that fill-in the gaps between the first dots is visually perceived, and banding is caused just the same.

Thus, the first dots are formed at a recording rate at which the first dots may or may not contact one another, and, at the intervals therebetween, dots are formed by the second dots that are smaller dots. In this way, with respect to the first dots, the first dots do not move because they do not interfere with one another because the rate of contact between the respective first dots is slight. Further, with regard to interference between the first dots and the second dots, the first dots have a large mass as compared with the second dots, and therefore, even if the first dots and the second dots contact one another, the first dots do not cause movement. Namely, because the first dots do not cause movement, the first dots do not become a cause of banding. On the other hand, the second dots cause movement and may become a cause of banding due to the second dots interfering with the first dots or the second dots interfering with one another. However, the first dots, that do not cause movement and that cover the entire surface, cover the second dots, and the ability to visually perceive the banding decreases. The occurrence of banding can be suppressed for these reasons.

Further, by forming the first dots at a recording rate at which the first dots may or may not contact one another, the first dots that have greater amounts of ink cover the entire surface while hardly contacting one another at all, and therefore, the amount of ink can be curbed. Accordingly, in accordance with the present exemplary embodiment, there is the effect of also suppressing the phenomenon of deformation of the sheet due to ink, such as curling or cockling or the like.

Figure 9:
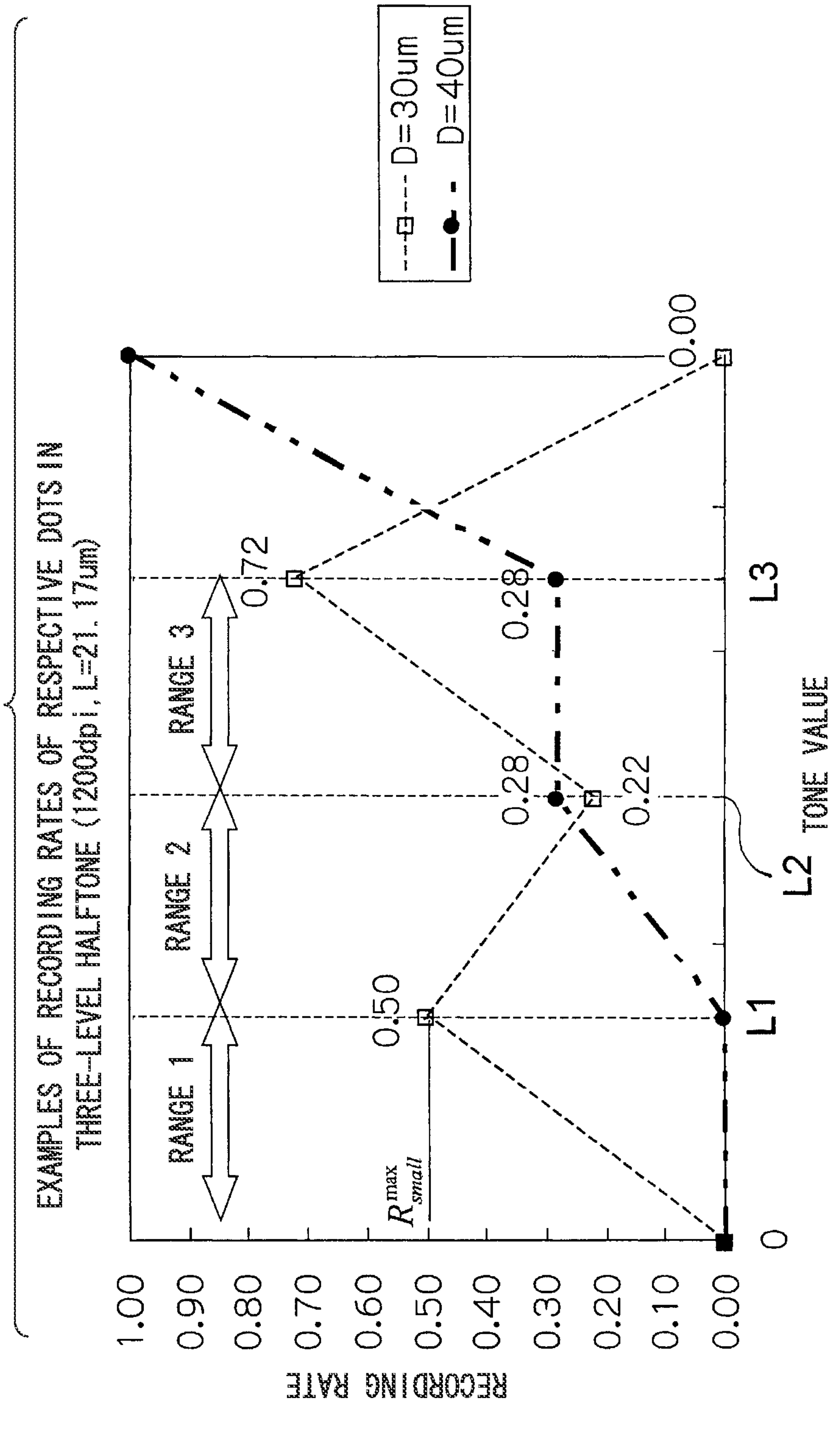
FIG. 9 is a drawing showing examples of recording rates by respective dots in a case of three-level halftone.

A concrete example is described hereinafter. The processing that is shown in this concrete example is processing that is executed by the image processor 91. FIG. 9 is a drawing showing examples of recording rates by the respective dots in a case of three-level halftone (D1=30 um, D2=40 um, L=21.17 um (1200 dpi)) for simplicity. The range to which numerical expression 7 is applied is range 3. Namely, the predetermined tone range is the tone range in which L2≦t≦L3, and is applied to range 3. Further, the first dots correspond to D2, and the second dots correspond to D1. In range 3, recording rate $R_2$ by the first dots is 0.28 as shown by the following numerical expression.

$$1=\alpha_2 R_2(40/21.17)^2\ (\alpha_2=1)$$

$$\Rightarrow R_2=0.28 \qquad \text{[Numerical Expression 8]}$$

Moreover, tone expression is carried out by forming the dots by a recording rate that is set in accordance with the tone value such that recording rate $R_1$ by the second dots varies from 0.22 to 0.72. Note that, in the method of setting the recording rate $R_1$ by the second dots, the recording rate $R_2$ by the first dots is prescribed and the tone value also is prescribed, and therefore, it suffices to set the recording rate $R_1$ to compensate for the portions at which the first dots are insufficient.

The recording rates for ranges other than range 3 are described next. First, range 1 is a tone range in which the tone value t≦L1<L2. Range 1 is a highlight range, and, at the highlight side, from the standpoint of graininess, it is preferable to eject only relatively small droplets. On the other hand, if the number of small droplets is increased too much, the small droplets contact one another and banding occurs. Accordingly, the recording rate $R_2$ of the first dots that are the larger dots is set to 0, and the recording rate $R_1$ by the second dots that are the smaller dots is set such that the second dots do not contact one another. Namely, the following numerical expression is satisfied.

$$\alpha_1 R_1(D_1/L)^2 \leqq 1$$

$$R_2=0 \qquad \text{[Numerical Expression 9]}$$

When numerical expression 9 is generalized, it becomes the numerical expression shown by numerical expression 10.

$$\sum_{i \leq i_s} \alpha_i R_i (D_i/L)^2 \leq 1 \qquad \text{[Numerical Expression 10]}$$

$$R_i = 0 (i > i_s)$$

In this way, in the highlight range, large droplets are not used, and the recording rate is set such that the small droplets do not contact one another. With regard to $R_1^{max}$ that is the maximum value of the recording rate of the small droplets in range 1, from the standpoint of graininess, it is preferable that $R_1$ in numerical expression 10 be such that:

$$\alpha_1 R_1(D_1/L)^2=1 \qquad \text{[Numerical Expression 11]}$$

However, in a case in which large droplets are added at the high density side (range 2), there is the possibility that the small droplets will contact the large droplets and cause banding. Accordingly, in order to avoid this problem, it is good to set the recording rate $R_1^{max}$ to be slightly smaller than the value expressed by numerical expression 11.

Next, with regard to range 2, range 2 is a tone range in which L1≦t≦L2. First, in a case in which the recording rate $R_1$ by the second dots is set as a recording rate at which the second dots just about contact one another such as the recording rate that satisfies numerical expression 11, if the first dots are added while the recording rate by the second dots remains fixed, the first dots and the second dots contact and give rise to banding. Accordingly, it is preferable to lower the recording rate $R_1$ by the second dots. On the other hand, if the recording rate $R_1$ by the second dots is lowered too much, the density tone reverses.

Thus, when a recording rate that satisfies following numerical expression 12 is used as the lower limit of the recording rate, reversal of the density tone can be avoided.

$$R_1^{max} \leqq R_1+R_2 \qquad \text{[Numerical Expression 12]}$$

Generally, setting is carried out as follows. A recording rate $R^{max}_{small}$, that generalizes $R_1^{max}$ by using the recording rate $R_i$ by the second dots at the immediately-previous tone value (L1 in FIG. 9) that uses the first dots, is defined as in following numerical expression 13:

$$R^{max}_{small} = \sum_{i \le i_s} R_i \quad \text{[Numerical Expression 13]}$$

wherein $$R^{max}_{small} = \sum_{j \le i_s} R_j$$

and $R_j$ is $R_j$ that satisfies above numerical expression 10 at tone value L1.

When $R^{max}_{small}$ is used, numerical expression 12 can be generalized as follows.

$$R^{max}_{small} = \sum_{i}^{n} R_i \quad \text{[Numerical Expression 14]}$$

Next, an upper limit is set for the recording rate in order to avoid the first dots and the second dots contacting one another and causing banding. To this end, the sum of the recording rates by the first dots and the second dots is made to be lower than the recording rate at which the dots may or may not contact one another at the $i_s$th dot. Namely, the values are set as follows.

$$\sum_{i}^{n} R_i \le \frac{1}{\alpha_i}\left(\frac{L}{D_{i_s}}\right)^2 \quad \text{[Numerical Expression 15]}$$

By combining above numerical expression 14 and numerical expression 15, following numerical expression 16 is obtained.

$$R^{max}_{small} \le \sum_{i}^{n} R_i \le \frac{1}{\alpha_i}\left(\frac{L}{D_{i_s}}\right)^2 \quad \text{[Numerical Expression 16]}$$

As shown at the left side in numerical expression 16, the sum of the recording rates by the first dots and the second dots is set so as to not be lower than value at the boundary of the range 1 and range 2, and therefore, the tone does not reverse. Further, as shown by the right side, the sum of the recording rates of range 2 (the sum of the recording rates of the first dots and the second dots) does not exceed the recording rate at which the dots may or may not contact one another at the $i_s$th dot, and therefore, movement due to contact (interference) and banding also do not occur. When the values are set in this way, the tones of tone ranges that are range 1 and range 3 can be connected smoothly by range 2 while banding is avoided.

Note that, in the present exemplary embodiment (FIG. 9), the following numerical expression is employed:

$$R_1^{max} \equiv R^{max}_{small} = \sum_{i}^{n} R_i = \frac{1}{\alpha_1}\left(\frac{L}{D_1}\right)^2 \quad \text{[Numerical Expression 17]}$$

As described above, on the basis of image data expressing the tone values of the respective pixels in an image that is to be formed on the sheet by the image processor 91 and the print control section 89, in the case of tone range [L2, L3] in which the tone value t is set in advance, the sizes of the ink that is ejected from the head 64 are controlled such that the first dots, whose diameter is greater than a predetermined diameter $D_s$, are formed at a recording rate that satisfies numerical expression 7, and such that the second dots, that are less than or equal to the predetermined diameter $D_{is}$, are formed between the first dots at a recording rate corresponding to the tone value. Note that it is suitable for the predetermined tone range to be a tone range that includes intermediate tone values, as will be described below.

Further, the first setting unit (the image processor 91), that sets the recording rate by the first dots in accordance with numerical expression 7, and the second setting unit (the image processor 91), that sets the recording rate by the second dots in accordance with the tone value, are included. The print control section 89 controls the sizes of the droplets that are ejected from the head 64 such that dots are formed at the set recording rate by the first dots and the set recording rate by the second dots.

Moreover, the predetermined tone range is set to [lower limit value L1, upper limit value L3], and L1 is set to a value that satisfies L1≦L2. In a case in which the tone value t satisfies t≦L1<L2, the recording rate by the first dots is set to 0, and the recording rate by the pixels by the second dots is set so as to satisfy the formula shown by numerical expression 10.

Further, in a case in which the tone value t satisfies L1≦t≦L2, the recording rate by the first dots and the recording rate by the second dots satisfy the formula shown by numerical expression 16.

In this way, banding due to dot movement that is caused by interference can be suppressed at all tones that are less than or equal to tone value L3 (>L2>L1).

Figure 10:
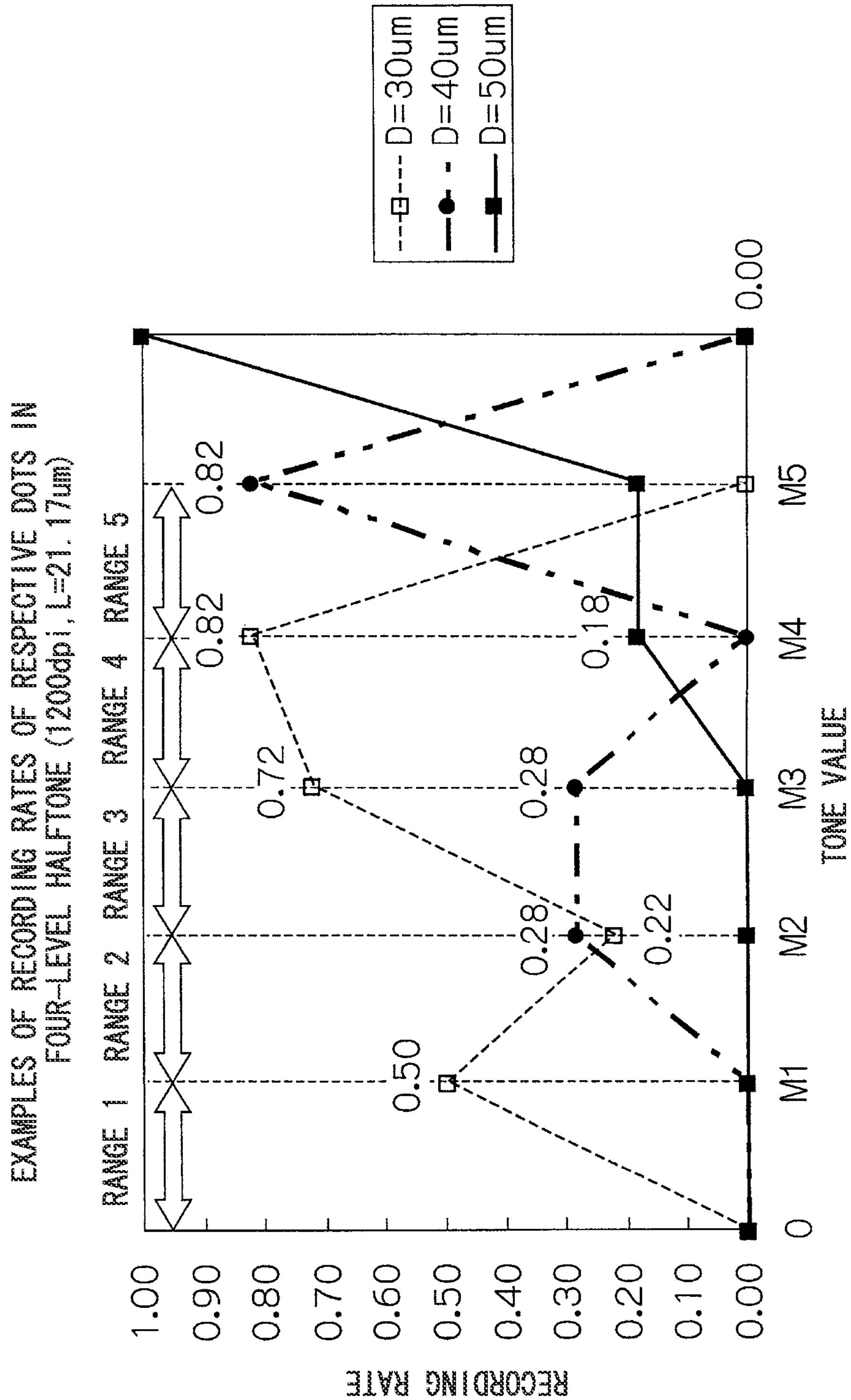
FIG. 10 is a drawing showing examples of recording rates by respective dots in a case of four-level halftone.

FIG. 9 describes a case in which three values are used. A case of four values (no droplet, small droplet (30 um), medium droplet (40 um), large droplet (50 um)) will be described by using FIG. 10. In FIG. 10, there are five ranges. Range 1 is 0 to M1, range 2 is M1 to M2, range 3 is M2 to M3, range 4 is M3 to M4, and range 5 is M4 to M5 (M1<M2<M3<M4<M5).

Only small droplets are used in range 1, and small droplets and medium droplets are used in ranges 2 and 3. In ranges 4 and 5, small droplets, medium droplets and large droplets are used.

Thereamong, in range 3, the droplets that correspond to the first dots are the medium droplets, and the droplets that correspond to the second dots are the small droplets. In range 4, the droplets that correspond to the first dots are the medium droplets and the large droplets, and the droplets that correspond to the second dots are the small droplets. Further, in range 5, the droplets that correspond to the first dots are the large droplets, and the droplets that correspond to the second dots are the small droplets and the medium droplets. Although the structures of the first dots differ in ranges 3, 4, 5, in all of these cases, numerical expression 7 is satisfied, and therefore, the occurrence of banding is suppressed.

Note that, in range 3 and range 5, the first dots are fixed and the recording rate of the second dots is changed, whereas, in range 4, tone expression is carried out by varying the recording rates of the respective dots that are the first dots. By using both a tone range in which the first dots are fixed and a tone range in which the first dots are varied in this way, respective tone ranges in which the structures of the first dots are different can be smoothly connected while suppressing banding.

In range 1, there are no first dots, and the small droplets that are the second dots satisfy numerical expression 10. Because the second dots do not cause interference with one another, banding does not arise. In range 2, the first dots correspond to the medium droplets and the second dots correspond to the small droplets, and both satisfy numerical expression 16. Accordingly, banding is suppressed in these ranges as well.

Namely, by applying the present technique, banding due to dot movement that arises due to interference can be suppressed in the wide tone range of ranges 1 through 5.

Figure 11:
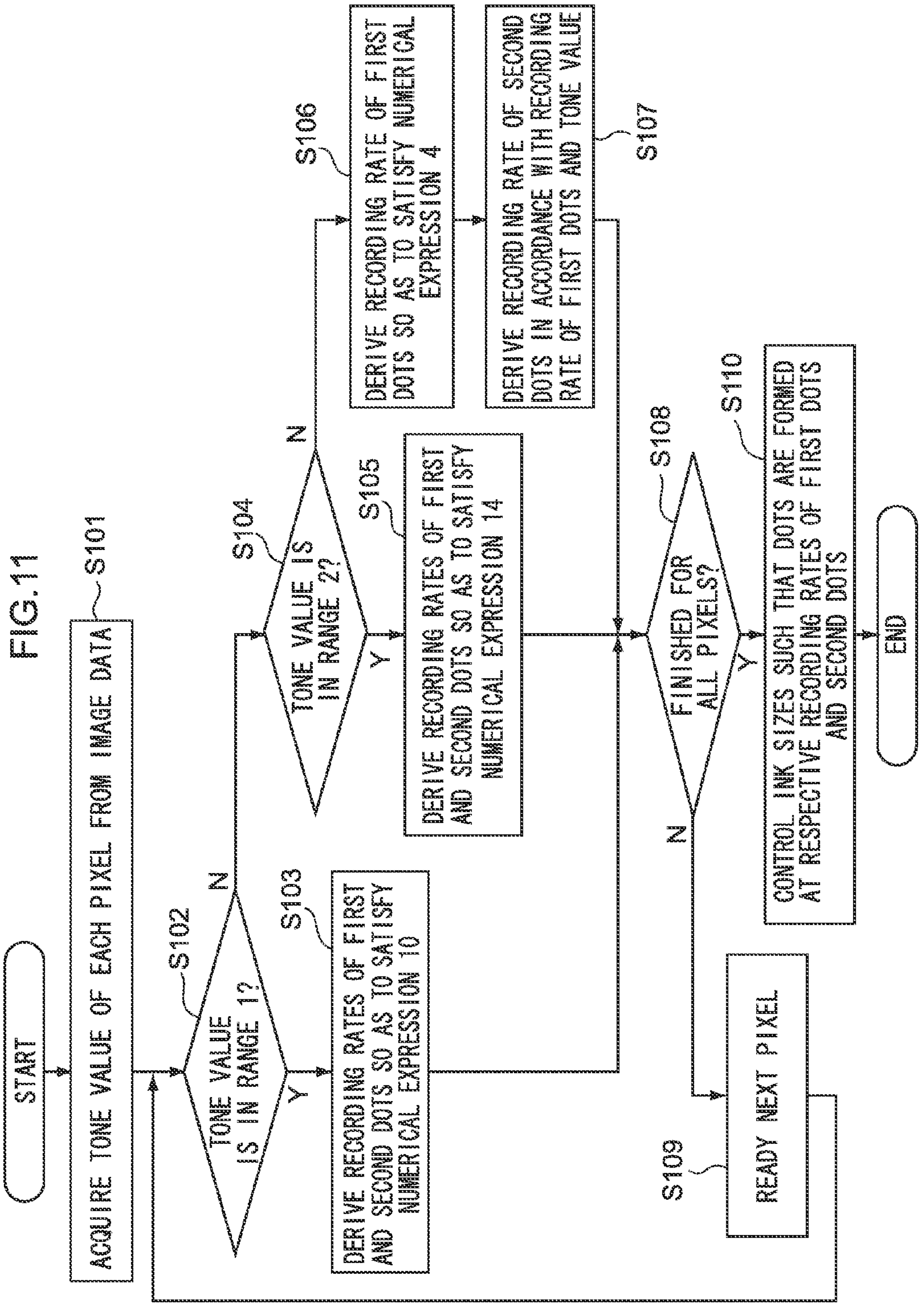
FIG. 11 is a flowchart showing the flow of recording rate setting processing.

A flowchart, that shows the flow of the processing of the recording rate setting that was described above, is described by using FIG. 11. This processing is processing that is executed by the CPUs of the image processor 91 and the print control section 89. Further, processing in the case described in FIG. 9 is illustrated.

First, in step 101, the tone values of the respective pixels are acquired from the image data. This image data is stored in the image buffer memory 91.

In next step 102, it is judged whether or not the tone value of the pixel is within the tone range of range 1. If the judgment in step 102 is affirmative, in step 103, the recording rates by the first and second dots are set so as to satisfy numerical expression 10, and the routine moves on to the processing of step 108.

If the judgment in step 102 is negative, in step 104, it is judged whether or not the tone value of the pixel is within the tone range of range 2. If the judgment in step 104 is affirmative, in step 105, the recording rates by the first and second dots are set to as to satisfy numerical expression 14, and the routine moves on to the processing of step 108.

If the judgment in step 104 is negative, the pixel value is greater than or equal to 127.5, and therefore, in step 106, the recording rate by the first dots is set so as to satisfy numerical expression 7. In step 107, the recording rate by the second dots is set in accordance with the tone value and the recording rate by the first dots, and the routine moves on to the processing of step 108. Note that, as described with regard to FIG. 9, step 107 and step 108 are applied only to range 3. For tone values that are larger than the upper limit of range 3, control may be carried out at a general recording rate.

Then, in step 108, it is judged whether or not processing is finished for all of the pixels. In a case in which processing is not finished, in step 109, the next pixel is readied, and the routine returns to the processing of step 102. On the other hand, in a case in which processing with respect to all of the pixels is finished, in step 110, the ink size is controlled such that the first dots and the second dots are formed at the respective recording rates of the first dots and the second dots, and processing ends.

Note that the above-described flow of processings of the flowchart is an example. The order of the processings may be rearranged, new steps may be added and unnecessary steps may be deleted, within a scope that does not deviate from the gist of the present invention.

Further, the above-described recording rate setting processing does not use only small dots as disclosed in the related art, and further, does not use different inks and does not make it such that the landing time difference exceeds the fixing time. Therefore, both productivity and low cost are achieved, and, further, banding can be suppressed.

In accordance with the aspect of the present invention, the droplet ejecting head ejects droplets with respect to a recording medium, and can form plural dots of different diameters. On the basis of image data expressing a tone value of each pixel in an image that is to be formed on the recording medium, the control unit controls the sizes of the droplets ejected from the droplet ejecting head such that, in a case in which the tone value is within a predetermined tone range, first dots, whose diameter is greater than a predetermined diameter, are formed at a recording rate that satisfies above formula (1), and second dots, whose diameter is less than or equal to the predetermined diameter, are formed between the first dots at a recording rate corresponding to the tone value. The first dots are thereby formed on the medium so as to cover the entire surface and without contacting one another. Thus, movement due to interference of the first dots is suppressed, and movement due to interference of the second dots is covered and hidden by the first dots. Therefore, there can be provided an image forming device that can suppress banding due to landing interference.

The image forming device relating to the aspect of the present invention may further include: a first setting unit that sets the recording rate by the first dots in accordance with formula (1); and a second setting unit that sets the recording rate by the second dots in accordance with the tone value, wherein the control unit controls the sizes of the droplets ejected from the droplet ejecting head such that dots are formed at the set recording rate by the first dots and the set recording rate by the second dots.

In accordance with the above-described aspect, recording rates by the respective dots can be set by the first setting unit, that sets the recording rate by the first dots, and the second setting unit, that sets the recording rate by the second dots.

In the image forming device relating to the aspect of the present invention, given that a lower limit value of the predetermined tone range is L2, a value that is smaller than the lower limit value L2 is L1, and a tone value t satisfies t≦L1, the recording rate by the first dots may be set to 0, and the recording rate by the second dots that corresponds to the tone value may be set so as to satisfy following formula (2).

[Numerical Expression 2]

$$\sum_{i \le i_s} \alpha_i R_i (D_i / L)^2 \le 1 \tag{2}$$

In accordance with the above-described aspect, contact between the second dots is suppressed such that landing interference can be made to not arise, and the image is drawn by only the second dots that are relatively small. Therefore, banding can be suppressed while the graininess at the highlight range where the tone value is 0 to t is maintained good.

In the image forming device relating to the aspect of the present invention, given that a lower limit value of the predetermined tone range is L2, a value that is smaller than the lower limit value L2 is L1, and the tone value t satisfies L1≦t≦L2, the recording rate by the first dots and the recording rate by the second dots may be set so as to satisfy following formula (3):

[Numerical Expression 3]

$$R_{small}^{max} \le \sum_{i} R_i \le \frac{1}{\alpha_{i_s}}\left(\frac{L}{D_{i_s}}\right)^2 \quad (3)$$

wherein $$R_{small}^{max} = \sum_{j \le i_s} R_j$$

where $R_j$ is $R_j$ that satisfies formula (2) at tone value L1.

In accordance with the above-described aspect, because the recording rates satisfy formula (3), the tones of t≦L1 that are structured only by the second dots, and the tones of t≧L2 that are structured by the first dots and the second dots, can be connected smoothly. Further, because interference between the first dots and the second dots is suppressed, banding at L1≦t≦L2 can be suppressed.

In the image forming device relating to the aspect of the present invention, structures of dots that are the first dots that satisfy formula (1) may have plural predetermined tone ranges that are different, and, in at least one of the predetermined tone ranges, recording rates of respective dots that are the first dots may be varied.

In accordance with the above-described aspect, plural tone ranges, that satisfy numerical expression 1 and have different structures of the first dots, can be connected while satisfying numerical expression 1. Therefore, smooth tone expression can be realized while suppressing banding.

In the image forming device relating to the aspect of the present invention, the control unit may effect control so as to eject droplets from the droplet ejecting head by an FM screening method.

In accordance with the above-described aspect, the FM screening method is used and not the AM screening method in which it is easy for banding to become conspicuous due to the cyclicality of the mesh. Therefore, banding can be suppressed even more.

In accordance with the present invention, there is the effect that an image forming device that can suppress banding due to landing interference can be provided.

What is claimed is:

1. An image forming device comprising:

a droplet ejecting head that ejects droplets with respect to a recording medium, and that can form a plurality of dots of different diameters; and a control unit that, on the basis of image data expressing a tone value of each pixel in an image that is to be formed on the recording medium, controls sizes of droplets ejected from the droplet ejecting head such that, in a case in which the tone value is within a predetermined tone range, first dots, whose diameter is greater than a predetermined diameter, are formed at a recording rate that satisfies following formula (1), and second dots, whose diameter is less than or equal to the predetermined diameter, are formed at a recording rate corresponding to the tone value:

[Numerical Expression 1]

$$\sum_{i \le i_s} \alpha_i R_i (D_i / L)^2 = 1 \quad (1)$$

wherein i is a number from 1 to N that is given to respective dots in order from a smallest diameter with a number of the plurality of types of dot diameters being N, $\alpha_i$ is a coefficient that satisfies $\pi/4 \leqq \alpha_i \leqq 1$ of an ith dot, $R_i$ is a recording rate of the ith dot, $D_i$ is a diameter of the ith dot, L is a length of one side of a pixel, and $i_s$ is a number of a dot of the predetermined diameter.

2. The image forming device of claim 1, further comprising:

a first setting unit that sets the recording rate by the first dots in accordance with formula (1); and a second setting unit that sets the recording rate by the second dots in accordance with the tone value, wherein the control unit controls the sizes of the droplets ejected from the droplet ejecting head such that dots are formed at the set recording rate by the first dots and the set recording rate by the second dots.

3. The image forming device of claim 2, wherein, assuming that a lower limit value of the predetermined tone range is L2, a value that is smaller than the lower limit value L2 is L1, and a tone value t satisfies t≦L1, the recording rate by the first dots is set to 0, and the recording rate by the second dots that corresponds to the tone value is set so as to satisfy following formula (2)

[Numerical Expression 2]

$$\sum_{i \le i_s} \alpha_i R_i (D_i / L)^2 \le 1. \quad (2)$$

4. The image forming device of claim 3, wherein, assuming that a lower limit value of the predetermined tone range is L2, a value that is smaller than the lower limit value L2 is L1, and the tone value t satisfies L1≦t≦L2, the recording rate by the first dots and the recording rate by the second dots are set so as to satisfy following formula (3):

[Numerical Expression 3]

$$R_{small}^{max} \le \sum_{i} R_i \le \frac{1}{\alpha_{i_s}}\left(\frac{L}{D_{i_s}}\right)^2 \quad (3)$$

wherein $$R_{small}^{max} = \sum_{j \le i_s} R_j$$

where $R_j$ is $R_j$ that satisfies formula (2) at tone value L1.

5. The image forming device of claim 2, wherein structures of dots that are the first dots that satisfy formula (1) have a plurality of the predetermined tone ranges that are different, and, in at least one of the predetermined tone ranges, recording rates of respective dots that are the first dots are varied.

6. The image forming device of claim 2, wherein the control unit effects control so as to eject droplets from the droplet ejecting head by an FM screening method.

7. The image forming device of claim 1, wherein, assuming that a lower limit value of the predetermined tone range is L2, and a value that is smaller than the lower limit value L2 is L1, and a tone value t satisfies t≦L1, the recording rate by the first dots is set to 0, and the recording rate by the second dots that corresponds to the tone value is set so as to satisfy following formula (2)

[Numerical Expression 2]

$$\sum_{i \le i_s} \alpha_i R_i (D_i / L)^2 \le 1. \tag{2}$$

8. The image forming device of claim 7, wherein, assuming that a lower limit value of the predetermined tone range is L2, a value that is smaller than the lower limit value L2 is L1, and the tone value t satisfies L1≦t≦L2, the recording rate by the first dots and the recording rate by the second dots are set so as to satisfy following formula (3):

[Numerical Expression 3]

$$R_{small}^{max} \le \sum_i R_i \le \frac{1}{\alpha_{i_s}} \left( \frac{L}{D_{i_s}} \right)^2 \tag{3}$$

wherein $$R_{small}^{max} = \sum_{j \le i_s} R_j$$

where $R_j$ is $R_j$ that satisfies formula (2) at tone value L1.

9. The image forming device of claim 8, wherein the control unit effects control so as to eject droplets from the droplet ejecting head by an FM screening method.

10. The image forming device of claim 7, wherein the control unit effects control so as to eject droplets from the droplet ejecting head by an FM screening method.

11. The image forming device of claim 1, wherein structures of dots that are the first dots that satisfy formula (1) have a plurality of the predetermined tone ranges that are different, and, in at least one of the predetermined tone ranges, recording rates of respective dots that are the first dots are varied.

12. The image forming device of claim 1, wherein the control unit effects control so as to eject droplets from the droplet ejecting head by an FM screening method.

* * * * *